US011589319B2

(12) United States Patent
Akkarakaran et al.

(10) Patent No.: US 11,589,319 B2
(45) Date of Patent: Feb. 21, 2023

(54) SIDELINK TRANSMIT POWER CONTROL COMMAND GENERATION

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Juan Montojo, San Diego, CA (US); Jung Ho Ryu, Fort Lee, NJ (US); Kapil Gulati, Hillsborough, NJ (US); Hong Cheng, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/947,574

(22) Filed: Aug. 6, 2020

(65) Prior Publication Data

US 2021/0045069 A1 Feb. 11, 2021

Related U.S. Application Data

(60) Provisional application No. 62/884,626, filed on Aug. 8, 2019.

(51) Int. Cl.
*H04W 52/24* (2009.01)
*H04W 52/16* (2009.01)
*H04W 52/38* (2009.01)
*H04W 52/36* (2009.01)
(Continued)

(52) U.S. Cl.
CPC ......... *H04W 52/244* (2013.01); *H04W 52/16* (2013.01); *H04W 52/325* (2013.01); *H04W 52/362* (2013.01); *H04W 76/15* (2018.02)

(58) Field of Classification Search
CPC ... H04W 4/46; H04W 4/80; H04W 76/00–15; H04W 88/00–06
See application file for complete search history.

(56) References Cited

U.S. PATENT DOCUMENTS

2006/0168343 A1 7/2006 Ma et al.
2009/0325625 A1* 12/2009 Hugl ................... H04W 52/244
455/522
(Continued)

FOREIGN PATENT DOCUMENTS

EP 2306778 A1 4/2011
WO 2006064411 A2 6/2006
WO WO-2017171895 A1 * 10/2017 ........... H04L 1/0001

OTHER PUBLICATIONS

International Search Report and Written Opinion—PCT/US2020/070381—ISA/EPO—dated Oct. 21, 2020.

*Primary Examiner* — San Htun
(74) *Attorney, Agent, or Firm* — Danai Nelisile Mhembere; Harrity & Harrity, LLP

(57) ABSTRACT

Various aspects of the present disclosure generally relate to wireless communication. In some aspects, a user equipment (UE) may receive, from a source UE, a first sidelink communication. The UE may generate a transmit power control command based at least in part on a signal to interference noise ratio measurement associated with the first sidelink communication. The UE may transmit, to control a transmit power for a second sidelink communication, the transmit power control command to the source UE. Numerous other aspects are provided.

30 Claims, 6 Drawing Sheets

(51) Int. Cl.
*H04W 52/32* (2009.01)
*H04W 76/15* (2018.01)

(56) References Cited

U.S. PATENT DOCUMENTS

| | | | |
|---|---|---|---|
| 2010/0093364 A1* | 4/2010 | Ribeiro | H04W 72/082 |
| | | | 455/452.2 |
| 2013/0324182 A1* | 12/2013 | Deng | H04W 52/242 |
| | | | 455/522 |
| 2014/0328329 A1* | 11/2014 | Novlan | H04W 56/002 |
| | | | 370/336 |
| 2015/0078270 A1 | 3/2015 | Seo et al. | |
| 2015/0139111 A1 | 5/2015 | Fodor et al. | |
| 2015/0173031 A1* | 6/2015 | Kim | H04W 52/545 |
| | | | 455/552.1 |
| 2015/0373766 A1* | 12/2015 | Morita | H04W 72/044 |
| | | | 370/330 |
| 2016/0234789 A1* | 8/2016 | Oh | H04W 4/06 |
| 2017/0230915 A1* | 8/2017 | Kim | H04W 52/34 |
| 2018/0139706 A1* | 5/2018 | Li | H04W 52/242 |
| 2018/0262993 A1 | 9/2018 | Akkarakaran et al. | |

\* cited by examiner

SIDELINK TRANSMIT POWER CONTROL COMMAND GENERATION

CROSS-REFERENCE TO RELATED APPLICATION

This Patent Application claims priority to U.S. Provisional Patent Application No. 62/884,626, filed on Aug. 8, 2019, entitled "SIDELINK TRANSMIT POWER CONTROL COMMAND GENERATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink transmit power control command generation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving, from a source UE, a first sidelink communication; generating a transmit power control command based at least in part on a signal to interference noise ratio measurement associated with the first sidelink communication; and transmitting, to control a transmit power for a second sidelink communication, the transmit power control command to the source UE.

In some aspects, a method of wireless communication, performed by a network entity, may include determining a transmit power control command based at least in part on a signal to interference noise ratio measurement associated with a first sidelink communication; and transmitting, to control a transmit power for a second sidelink communication, the transmit power control command to a source UE.

In some aspects, a UE for wireless communication may include memory and one or more processors operatively coupled to the memory. The memory and the one or more processors may be configured to receive, from a source UE, a first sidelink communication; generate a transmit power control command based at least in part on a signal to interference noise ratio measurement associated with the first sidelink communication; and transmit, to control a transmit power for a second sidelink communication, the transmit power control command to the source UE.

In some aspects, a network entity for wireless communication may include memory and one or more processors operatively coupled to the memory. The memory and the one or more processors may be configured to determine a transmit power control command based at least in part on a signal to interference noise ratio measurement associated with a first sidelink communication; and transmit, to control a transmit power for a second sidelink communication, the transmit power control command to a source UE.

In some aspects, a non-transitory computer-readable medium may store one or more instructions for wireless communication. The one or more instructions, when executed by one or more processors of a source UE, may cause the one or more processors to receive, from a source UE, a first sidelink communication; generate a transmit power control command based at least in part on a signal to interference noise ratio measurement associated with the first sidelink communication; and transmit, to control a transmit power for a second sidelink communication, the transmit power control command to the source UE.

In some aspects, a non-transitory computer-readable medium may store one or more instructions for wireless communication. The one or more instructions, when executed by one or more processors of a network entity, may cause the one or more processors to determine a transmit power control command based at least in part on a signal to interference noise ratio measurement associated with a first sidelink communication; and transmit, to control a transmit power for a second sidelink communication, the transmit power control command to a source UE.

In some aspects, an apparatus for wireless communication may include means for receiving, from a source UE, a first sidelink communication; means for generating a transmit power control command based at least in part on a signal to interference noise ratio measurement associated with the first sidelink communication; and means for transmitting, to control a transmit power for a second sidelink communication, the transmit power control command to the source UE.

In some aspects, an apparatus for wireless communication may include means for determining a transmit power control command based at least in part on a signal to interference noise ratio measurement associated with a first sidelink communication; and means for transmitting, to control a transmit power for a second sidelink communication, the transmit power control command to a source UE.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
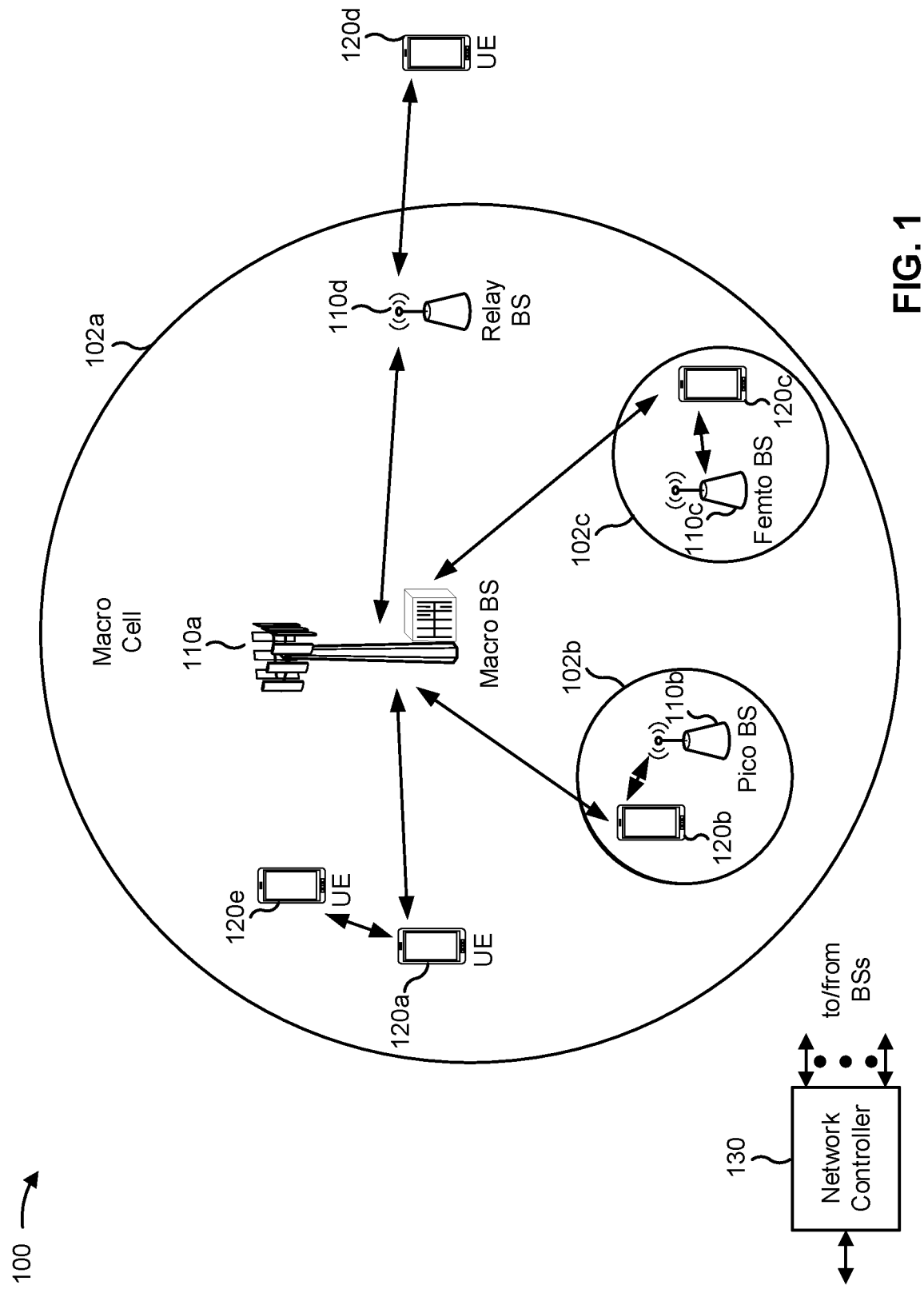
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
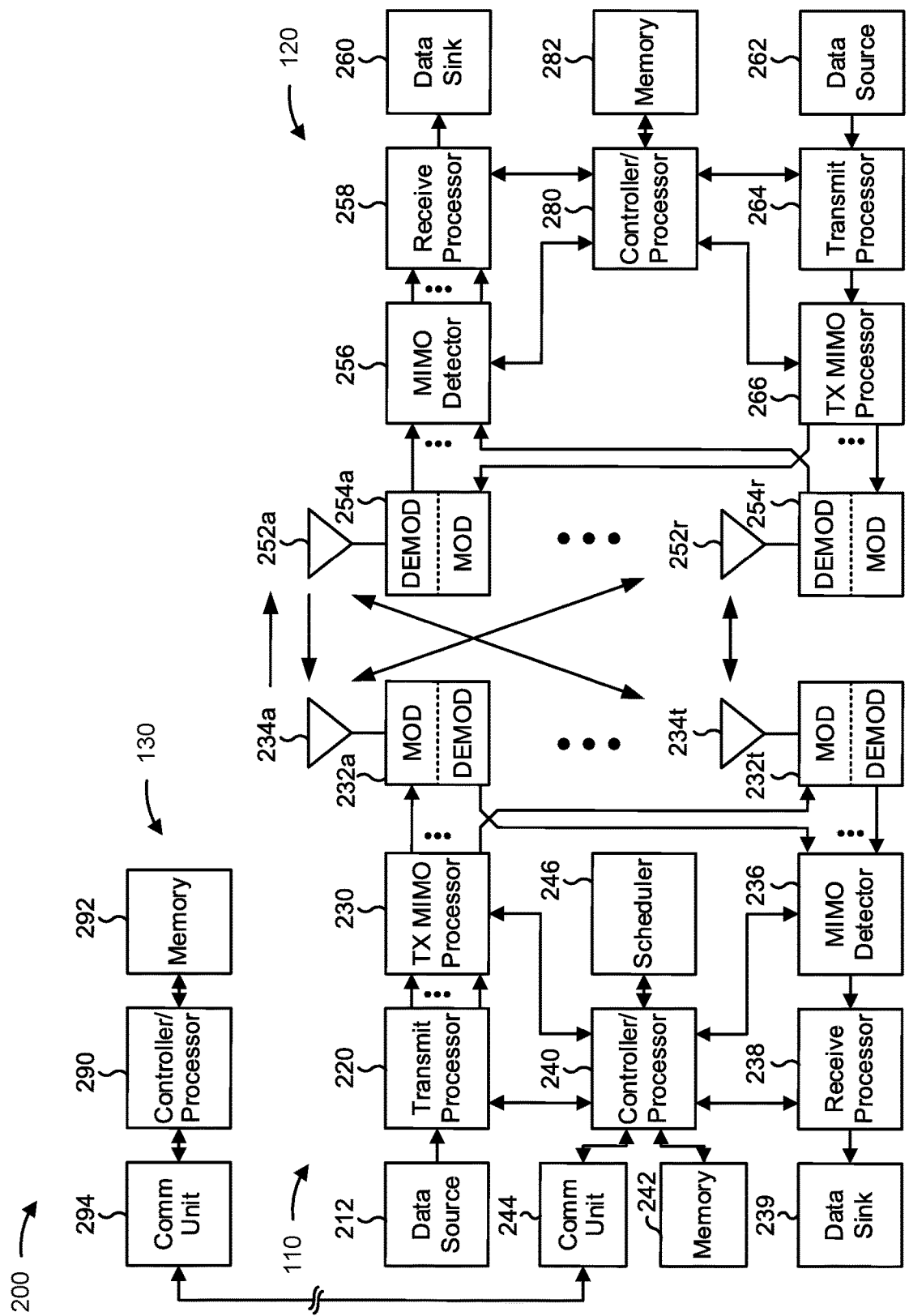
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with sidelink transmit power control command generation, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for receiving, from a source UE, a first sidelink communication, means for generating a transmit power control command based at least in part on a signal to interference noise ratio measurement associated with the first sidelink communication, means for transmitting, to control a transmit power for a second sidelink communication, the transmit power control command to the source UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a network entity (e.g., a BS 110, such as a relay BS, a UE 120, such as a relay UE, and/or the like) may include means for determining a transmit power control command based at least in part on a signal to interference noise ratio measurement associated with a first sidelink communication, means for transmitting, to control a transmit power for a second sidelink communication, the transmit power control command to a source UE, and/or the like. In some aspects, such means may include one or more components of BS 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

In some communications systems, such as in LTE device to device (D2D), LTE V2X, NR V2X, and/or the like, a first UE may communicate with a second UE using a sidelink. For example, a source UE may transmit a sidelink communication to a target UE on the sidelink. The source UE may be a UE for which a power control procedure is to be performed and the target UE may be a UE that is an intended recipient of a transmission from the source UE for which the transmit power is controlled. The source UE may determine a transmit power for the transmission based at least in part on a static stored configuration. However, the static stored configuration may result in excess transmit power that may cause interference with another UE and may reduce a UE battery life. Additionally, or alternatively, the static stored configuration may result in a transmit power that results in insufficient transmit power that causes a communication failure, which could result in a loss of connectivity, a lower data rate, a higher power consumption due to data retransmissions, and/or the like.

Using an open-loop power control technique, the source UE may measure a pathloss of a received transmission (e.g., from another UE on a sidelink, from a BS on an access link, and/or the like) and adjust a transmit power based at least in part on the pathloss. However, open-loop power control may be subject to pathloss measurement errors, such as when the source UE or a target UE is changing location or relative orientation. As a result, open-loop power control may result in poor transmit power determination.

Some aspects described herein provide for generating a transmit power control command to enable closed-loop transmit power control for sidelink communications. For example, a target UE, a non-target UE, a network entity, and/or the like may generate a transmit power control command based at least in part on a signal to interference noise ratio (SINR) measurement of a first sidelink communication of a source UE. In this way, an accuracy of transmit power control is improved for sidelink communication, relative to open-loop power control techniques. Moreover, based at least in part on improving the accuracy of transmit power control, a likelihood of dropped communications due to insufficient transmit power and a likelihood of interfering communications due to excessive transmit power may be reduced.

Figure 3:
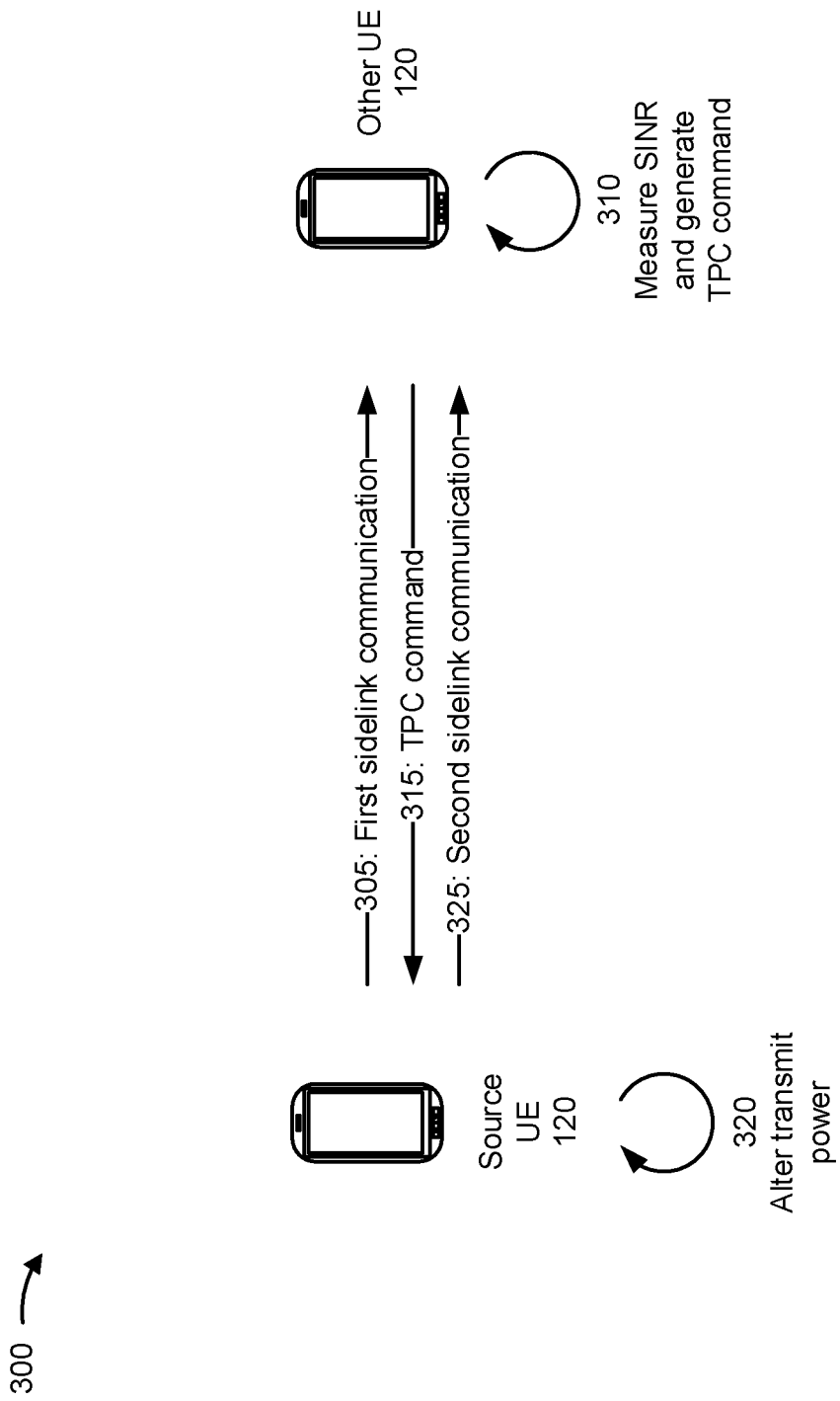
FIGS. 3 and 4 are diagrams illustrating examples of sidelink transmit power control command generation, in accordance with various aspects of the present disclosure.

FIG. 3 is a diagram illustrating an example 300 of sidelink transmit power control command generation, in accordance with various aspects of the present disclosure. As shown in FIG. 3, example 300 may include a source UE 120 and another UE 120 (e.g., a target UE 120 or a non-target UE 120), as described in more detail herein.

As further shown in FIG. 3, and by reference number 305, source UE 120 may transmit a first sidelink communication to the other UE 120. For example, source UE 120 may transmit the first sidelink communication to a target UE 120, which is an intended recipient of the first sidelink communication. In this case, the target UE 120 may perform a sidelink reception quality measurement on the first sidelink communication, such as determining a reference signal received quality (RSRQ), an SINR, and/or the like.

Additionally, or alternatively, source UE 120 may transmit the first sidelink communication to a non-target UE 120, which is not an intended recipient of the first sidelink communication. For example, based at least in part on source UE 120 being within a threshold proximity of non-target UE 120, the first sidelink communication may interfere with communications of the non-target UE 120. In this case, based at least in part on receiving the interfering first sidelink communication, the non-target UE 120 may perform an interference measurement of the first sidelink communication.

As further shown in FIG. 3, and by reference numbers 310 and 315, the other UE 120 may perform a measurement of the first sidelink communication, generate a transmit power control (TPC) command, and provide the transmit power control command to source UE 120. For example, when the other UE 120 is a target UE 120, the other UE 120 may determine the transmit power control command based at least in part on a sidelink reception quality determination for the first sidelink communication. In this case, the other UE 120 may determine the transmit power control command to ensure an adequate level of transmit power to avoid a dropped communication during a subsequent transmission. Additionally, or alternatively, when the other UE 120 is a non-target UE 120, the other UE 120 may determine the transmit power control command based at least in part on an interference measurement of the first sidelink communication. In this case, the other UE 120 may determine the transmit power control command to avoid interference during a subsequent transmission.

In some aspects, the other UE 120 may determine an SINR and generate the transmit power control command based at least in part on the SINR. For example, the other UE 120 may compare a measured SINR to a target SINR for the sidelink, and may determine to alter a transmit power to cause the sidelink to achieve the target SINR. In this case, the other UE 120 may determine to increase a transmit power, decrease a transmit power, and/or the like to alter the SINR for the sidelink.

In some aspects, the other UE 120 may measure a particular channel to determine the SINR. For example, the other UE 120 may measure a demodulation reference signal (DMRS) included in a physical sidelink control channel (PSCCH) or physical sidelink shared channel (PSSCH) transmitted in connection with the first sidelink communication. In this case, the DMRS and data symbols of the first sidelink communication may be associated with a power offset relating to a modulation and coding scheme (MCS) or a format of the DMRS and/or the data symbols. In other words, as a result of a first transmit power being used for the DMRS and a second transmit power being used for the data symbols, with both these transmit powers varying as a function of MCS used, the other UE 120 may offset a power determination associated with a measurement of the DMRS when generating a transmit power control command for application to data symbols of a subsequent second sidelink communication (e.g., which may use a different MCS that may not be known to a receiver in advance).

In some aspects, the other UE 120 may measure a channel state information reference signal (CSI-RS) or a sounding reference signal (SRS) that is transmitted with the first sidelink communication. In this case, in contrast to using a DMRS, the other UE 120 may determine the transmit power based at least in part on measurements of the CSI-RS or SRS without including an offset relating to differences between the CSI-RS or SRS and the data symbols of a subsequent second sidelink communication. In some aspects, the other UE 120 may select which reference signal to use based at least in part on a power control configuration of source UE 120. For example, when source UE 120 applies independent power control to sidelink communications and to CSI-RSs or SRSs, the other UE 120 may determine to use a DMRS-based measurement to generate a transmit power control command rather than a CSI-RS measurement or an SRS measurement.

In some aspects, the other UE 120 may receive a reference signal (e.g., a CSI-RS or SRS) for power control of the first sidelink communication based at least in part on receiving a sidelink control information (SCI) from source UE 120. In some aspects, the other UE 120 may determine a delay time between receiving a message triggering receipt of a reference signal (e.g., an SCI) and receiving the reference signal based at least in part on another channel delay time. For example, when the reference signal is transmitted in connection with a shared channel payload (e.g., a DMRS), source UE 120 may use a delay time value for a delay between a PSCCH and a PSSCH as the delay time between receiving an SCI triggering receipt of the DMRS and receiving the DMRS. In this way, the delay time value may enable a threshold amount of time for processing a received signal to generate a transmit power control command.

In some aspects, the other UE 120 may be configured with a minimum delay time based at least in part on a capability of the other UE 120. For example, based at least in part on a processing capability, the other UE 120 may configure a minimum time between receiving a message triggering receipt of a reference signal for sidelink power control and receiving the reference signal, to reduce a likelihood that the reference signal is dropped. Similarly, in some aspects, the other UE 120 may track a minimum delay time between receiving the reference signal and subsequently transmitting the transmit power control command to source UE 120. In this case, the other UE 120 ensures that source UE 120 does not attempt to receive the transmit power control command until a resource after a period of time for the other UE 120 to generate the transmit power control command.

In some aspects, the other UE 120 may combine a plurality of transmit power control commands based at least in part on the minimum delay time. For example, the other UE 120 may not have an allocated resource reserved for transmitting a first transmit power control command in a time between generating the first transmit power control command and receiving another reference signal. In this case, the other UE 120 may combine the first transmit power control command with a second transmit power control command generated based at least in part on the other reference signal. In some aspects, the other UE 120 may perform a particular procedure to combine a plurality of transmit power control commands. For example, the other UE 120 may average or combine a plurality of transmit power control commands, select a latest generated transmit power control command of a plurality of transmit power control command, and/or the like.

In some aspects, the other UE 120 may transmit the transmit power control command at a sequentially first opportunity after a minimum delay time. In this way, the other UE 120 ensures that source UE 120 can determine which sidelink transmission triggered the transmit power control command. In some aspects, a transmission opportunity for transmitting the power control command may be channel specific. For example, the other UE 120 may use a first transmission opportunity for transmitting a transmit power control command for controlling a PSSCH and a second transmission opportunity for transmitting a transmit power command for controlling a PSCCH. In this way, the other UE 120 enables source UE 120 to determine which channel is to be controlled by a transmit power control command.

In some aspects, the other UE 120 may measure another beam (e.g., a different beam from a beam of the first sidelink communication) to determine a sidelink SINR and generate the transmit power control command. For example, the other UE 120 may identify another beam that is quasi-co-located with a beam conveying the first sidelink communication, and may measure the other beam. In some aspects, the other UE 120 may perform a plurality of measurements of a plurality of channels. For example, when source UE 120 transmits a PSSCH, a PSCCH, and/or a physical sidelink feedback channel (PSFCH) using different beams (e.g., to enable different recipients for the different channels, such as a groupcast set of recipients for the PSCCH and a single unicast recipient for the PSSCH), the other UE 120 may perform separate measurements of the different beams, and may generate a plurality of transmit power control commands.

In some aspects, the other UE 120 may configure a frequency of measurements based at least in part on a quantity of measurements that are to be performed. For example, when measuring an SINR of a single channel and generating a single transmit power control command, the other UE 120 may perform measurements relatively frequently. In contrast, when measuring a plurality of SINRs of a plurality of channels, the other UE 120 may perform measurements relatively infrequently. In this way, the other UE 120 compensates for increased processing complexity and reference signal overhead associated with measuring the plurality of SINRs. Further, the other UE 120 may use the infrequently measured SINRs of the individual channels to estimate the differences in SINRs between individual channels, and then use estimated channel differences to predict individual channel SINRs more frequently, based at least in part on the more frequent measurements of a single one of the individual channels.

In some aspects, the other UE 120 may measure a channel state information interference measurement (CSI-IM). For example, when the other UE 120 is a non-target UE 120, the other UE 120 may measure vacant resource elements to determine a transmit power, and may detect the first sidelink communication when measuring the vacant resource elements. In some aspects, the other UE 120 may monitor a resource that includes the first sidelink communication and/or another resource used by source UE 120 (e.g., a CSI-RS resource, an SRS resource, and/or the like) for power control (e.g., despite not being an intended recipient of the first sidelink communication or any other communication from source UE 120). In this case, the other UE 120 may generate a transmit power control command based at least in part on a measurement performed on a monitored resource or channel satisfying a measurement threshold. For example, based at least in part on a CSI-IM measurement satisfying a measurement threshold indicating a threshold likelihood of interference, the other UE 120 may generate a transmit power control command for source UE 120.

In some aspects, the measurement threshold may be dynamically configured. For example, the other UE 120 may determine a value for the measurement threshold based at least in part on whether communication activity is expected on other victim links that are within a proximity of source UE 120 (e.g., links that can be interfered by a subsequent second sidelink communication). Additionally, or alternatively, the other UE 120 may determine the value for the measurement threshold based at least in part on an MCS expected on the other victim links, a beam configuration of the other victim links relative to a beam configuration of the sidelink for the subsequent second sidelink communication, and/or the like.

As further shown in FIG. 3, and by reference numbers 320 and 325, source UE 120 may alter a transmit power and transmit a second sidelink communication. For example, based at least in part on receiving the transmit power control command from the other UE 120, source UE 120 may increase or decrease a transmit power for subsequent sidelink communications. Additionally, or alternatively, source UE 120 may maintain the transmit power at a current transmit power level based at least in part on receiving the transmit power control command. For example, source UE 120 may determine that the transmit power control command includes information indicating that a transmit power is not to be altered. In some aspects, source UE 120 may alter transmit powers of different channels of the second sidelink communication based at least in part on a plurality of received transmit power control commands. In this way, source UE 120 and the other UE 120 enable closed-loop power control for sidelink communications.

As indicated above, FIG. 3 is provided as an example. Other examples may differ from what is described with respect to FIG. 3.

Figure 4:
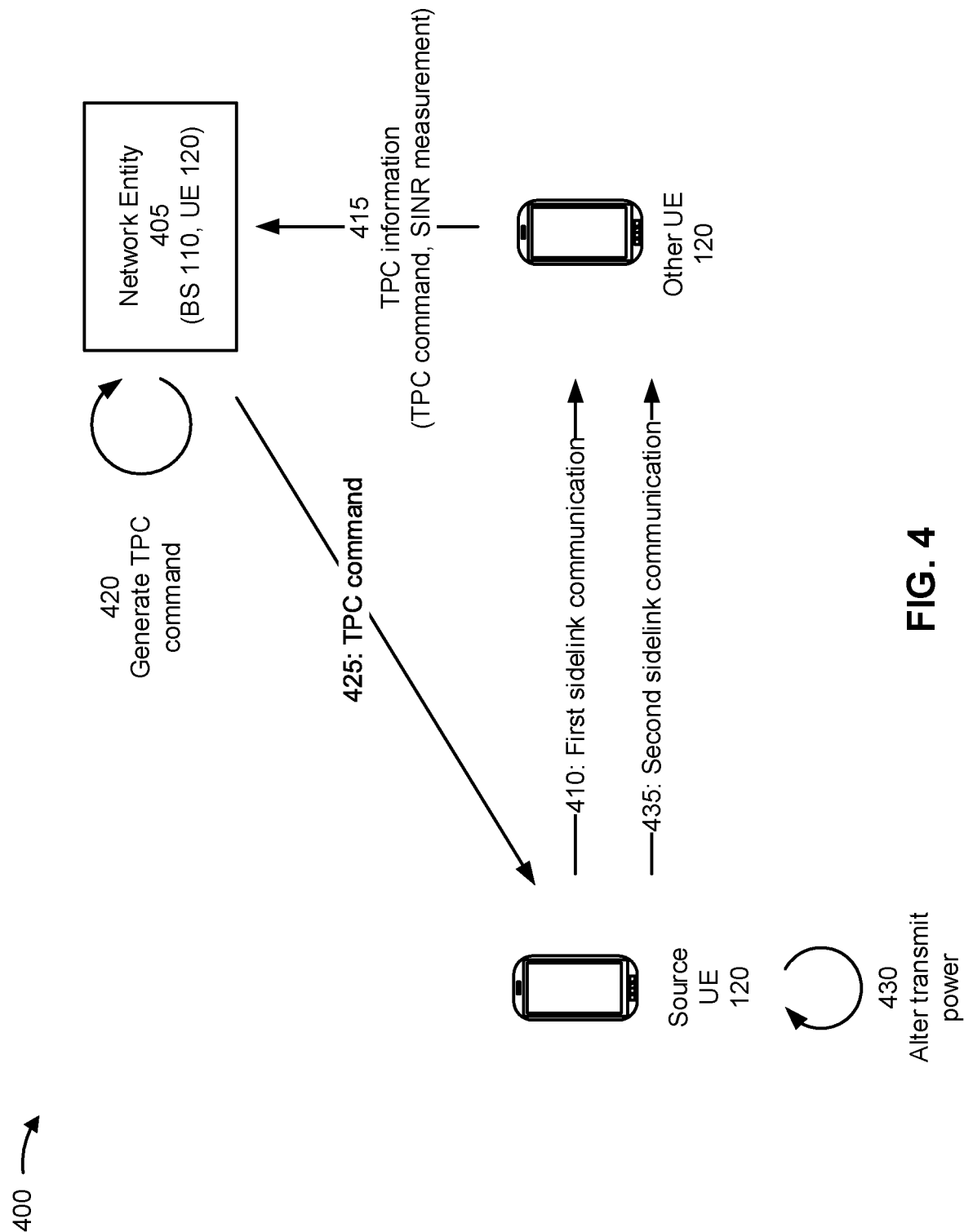

FIG. 4 is a diagram illustrating an example 400 of sidelink transmit power control command generation, in accordance with various aspects of the present disclosure. As shown in FIG. 4, example 400 may include a network entity 405 (e.g., which may be a relay BS or a relay UE), a source UE 120, and another UE 120 (e.g., which may be a target UE or a non-target UE), as described in more detail herein.

As further shown in FIG. 4, and by reference number 410, source UE 120 may transmit a first sidelink communication to the other UE 120. For example, source UE 120 may transmit the first sidelink communication to a target UE 120, which is an intended recipient of the first sidelink communication. In this case, the target UE 120 may perform a sidelink reception quality measurement on the first sidelink communication, such as determining an RSRQ, an SINR, and/or the like.

Additionally, or alternatively, source UE 120 may transmit the first sidelink communication to a non-target UE 120, which is not an intended recipient of the first sidelink communication. For example, based at least in part on source UE 120 being within a threshold proximity of non-target UE 120, the first sidelink communication may interfere with communications of non-target UE 120. In this case, based at least in part on receiving the first sidelink communication, non-target UE 120 may perform an interference measurement of the first sidelink communication. Additionally, or alternatively, based at least in part on network entity 405 being within the threshold proximity of source UE 120, network entity 405 may perform a measurement of the first sidelink communication, such as an interference measurement of the first sidelink communication.

As further shown in FIG. 4, and by reference number 415, the other UE 120 may provide transmit power control information to network entity 405 for relay to source UE 120. For example, the other UE 120 may provide information identifying a transmit power control command determined by the other UE 120, as described in more detail herein. Additionally, or alternatively, the other UE 120 may provide, to network entity 405, information identifying a measurement performed by the other UE 120, such as an SINR measurement, reception quality measurement, an interference measurement, and/or the like, to enable network entity 405 to determine a transmit power control command.

As further shown in FIG. 4, and by reference numbers 420 and 425, network entity 405 may generate a transmit power control command and may provide the transmit power control command to source UE 120. For example, based at least in part on receiving a transmit power control command, network entity 405 may determine to relay the transmit power control command to source UE 120. Additionally, or alternatively, based at least in part on receiving information identifying a measurement, network entity 405 may generate a transmit power control command.

Additionally, or alternatively, network entity 405 may generate the transmit power control command based at least in part on a measurement performed by network entity 405. For example, network entity 405 may determine an alteration to a transmit power of source UE 120 based at least in part on performing an SINR measurement of the first sidelink communication.

In some aspects, network entity 405 may consolidate a plurality of transmit power control commands to generate the transmit power control command. For example, when transmit power control commands are relayed across a plurality of hops of a multi-hop network, network entity 405 may consolidate a plurality of received transmit power control commands, a plurality of generated transmit power control commands, a combination of received and generated transmit power control commands, and/or the like into a single transmit power control command to reduce overhead signaling of a sidelink network. In this case, a minimum time delay may be defined between receiving a transmit power control command and relaying the transmit power control command and/or including the transmit power control command in a consolidation of transmit power control commands. For example, based at least in part on a capability of network entity 405, network entity 405 may determine that transmit power control commands received within a threshold period of time of a first transmission opportunity for transmitting transmit power control commands are to be delayed until a second, subsequent transmission opportunity for transmitting transmit power control commands.

In some aspects, network entity 405 may select a maximum transmit power control command when consolidating a plurality of transmit power control commands. For example, when network entity 405 receives, from a plurality of other UEs 120, a plurality of transmit power control commands indicating a transmit power for source UE 120, network entity 405 may select a particular transmit power control command indicating a greatest transmit power. In this case, network entity 405 may provide a single transmit power control command indicating the greatest transmit power to source UE 120.

In some aspects, network entity 405 may use information identifying transmit power control command step sizes for each other UE 120 to determine which transmit power control command indicates a greatest transmit power. In some aspects, network entity 405 may consolidate the plurality of transmit power control commands based at least in part on storing information identifying step sizes for each other UE 120. In contrast, when network entity 405 lacks stored information identifying a step size for another UE 120, network entity 405 may forgo consolidating transmit power control commands or may consolidate only transmit power control commands for other UEs 120 for which network entity 405 stores step size information.

In some aspects, network entity 405 may consolidate the plurality of transmit power control commands based at least in part on an index value. For example, network entity 405 may select a highest indexed transmit power control command and provide the highest indexed transmit power control command to source UE 120. In this case, each transmit power control command may have the same step size or different step sizes. In some aspects, network entity 405 may consolidate the plurality of transmit power control commands based at least in part on a signal strength of a plurality of other UEs 120. For example, network entity 405 may select a transmit power control command from a UE 120 with a lowest SINR to relay to source UE 120. In this case, network entity 405 may identify the UE 120 with the lowest SINR based at least in part on RSRP reports received from the plurality of other UEs 120 that provide transmit power control commands for consolidation and/or for relay to source UE 120. In some aspects, network entity 405 may consolidate the plurality of transmit power control commands based at least in part on a plurality of factors, such as based at least in part on a maximum transmit power and based at least in part on an index value.

As further shown in FIG. 4, and by reference numbers 430 and 435, source UE 120 may alter a transmit power and transmit a second sidelink communication. For example, based at least in part on receiving the transmit power control command from network entity 405, source UE 120 may alter a transmit power for subsequent sidelink communications. In some aspects, source UE 120 may receive a plurality of transmit power control commands. For example, source UE 120 may receive a transmit power control command from network entity 405, from a UE 120 (e.g., a target UE, a non-target UE, and/or the like), and may aggregate the transmit power control commands to determine a subsequent transmit power. In this way, source UE 120, the other UE 120, and network entity 405 enable closed-loop power control for sidelink communications.

As indicated above, FIG. 4 is provided as an example. Other examples may differ from what is described with respect to FIG. 4.

Figure 5:
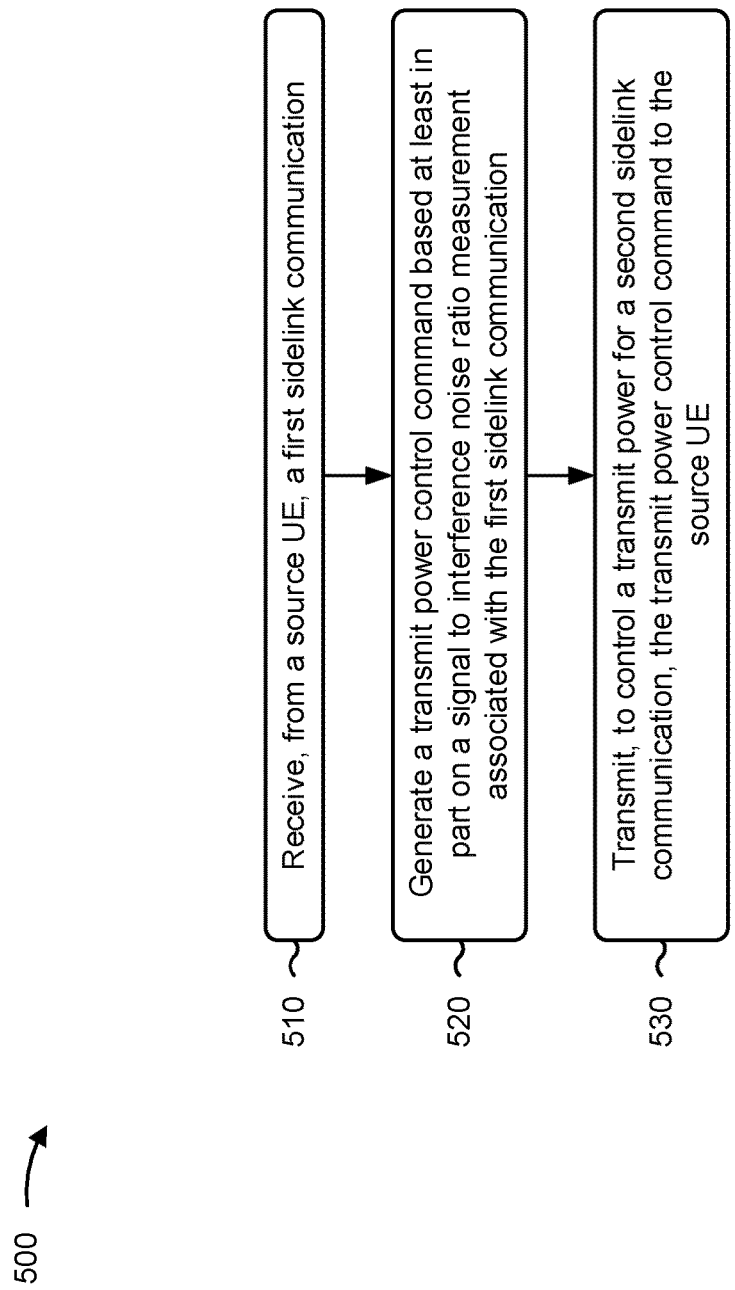
FIG. 5 is a diagram illustrating an example process performed, for example, by a user equipment, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120 and/or the like) performs operations associated with sidelink transmit power control command generation.

As shown in FIG. 5, in some aspects, process 500 may include receiving, from a source UE, a first sidelink communication (block 510). For example, the UE (e.g., using receive processor 258, transmit processor 264, controller/processor 280, memory 282, and/or the like) may receive, from a source UE, a first sidelink communication, as described above.

As further shown in FIG. 5, in some aspects, process 500 may include generating a transmit power control command based at least in part on a signal to interference noise ratio measurement associated with the first sidelink communication (block 520). For example, the UE (e.g., using receive processor 258, transmit processor 264, controller/processor 280, memory 282, and/or the like) may generate a transmit power control command based at least in part on a signal to interference noise ratio measurement associated with the first sidelink communication, as described above.

As further shown in FIG. 5, in some aspects, process 500 may include transmitting, to control a transmit power for a second sidelink communication, the transmit power control command to the source UE (block 530). For example, the UE (e.g., using receive processor 258, transmit processor 264, controller/processor 280, memory 282, and/or the like) may transmit, to control a transmit power for a second sidelink communication, the transmit power control command to the source UE, as described above.

Process 500 may include additional aspects, such as any single aspect or any combination of aspects described below and/or in connection with one or more other processes described elsewhere herein.

In a first aspect, the signal to interference noise ratio measurement is performed on a reference signal transmitted in connection with the first sidelink communication, and the reference signal is at least one of a channel state information reference signal, a sounding reference signal, or a demodulation reference signal.

In a second aspect, alone or in combination with the first aspect, the signal to interference noise ratio measurement is performed on decoded data symbols of the first sidelink communication.

In a third aspect, alone or in combination with one or more of the first and second aspects, the transmit power control command is based at least in part on a power offset value.

In a fourth aspect, alone or in combination with one or more of the first through third aspects, the power offset value is based at least in part on a transmit data-to-pilot power ratio or a modulation and coding scheme.

In a fifth aspect, alone or in combination with one or more of the first through fourth aspects, the signal to interference noise ratio measurement is performed on another transmission that is quasi co-located with the first sidelink communication.

In a sixth aspect, alone or in combination with one or more of the first through fifth aspects, the transmit power control command is based at least in part on a type of channel of the first sidelink communication.

In a seventh aspect, alone or in combination with one or more of the first through sixth aspects, the type of channel is at least one of a physical sidelink control channel, a physical sidelink shared channel, a physical sidelink feedback channel, a sidelink channel state information reference signal channel, a sidelink tracking reference signal channel, or a sidelink positioning reference signal channel.

In an eighth aspect, alone or in combination with one or more of the first through seventh aspects, the transmit power control command is based at least in part on a type of transmission of the first sidelink communication.

In a ninth aspect, alone or in combination with one or more of the first through eighth aspects, the type of transmission is a groupcast transmission or a unicast transmission.

In a tenth aspect, alone or in combination with one or more of the first through ninth aspects, a periodicity of the signal to interference noise ratio measurement is based at least in part on a processing characteristic of the first sidelink communication.

In an eleventh aspect, alone or in combination with one or more of the first through tenth aspects, the transmit power control command is based at least in part on a signal to noise ratio difference between the first sidelink communication and another communication.

In a twelfth aspect, alone or in combination with one or more of the first through eleventh aspects, the transmit power control command is based at least in part on a channel state information interference measurement.

In a thirteenth aspect, alone or in combination with one or more of the first through twelfth aspects, the transmit power control command is based at least in part on a vacant resource element measurement.

In a fourteenth aspect, alone or in combination with one or more of the first through thirteenth aspects, the first sidelink communication is received based at least in part on monitoring for the first sidelink communication.

In a fifteenth aspect, alone or in combination with one or more of the first through fourteenth aspects, the transmit power control command is generated based at least in part on the signal to interference noise ratio measurement satisfying a threshold.

In a sixteenth aspect, alone or in combination with one or more of the first through fifteenth aspects, the threshold is based at least in part on at least one of an interference criterion, a reference signal received power, a modulation and coding scheme on another link that is interfered with by the first sidelink communication, or a configuration of a receiver beam.

In a seventeenth aspect, alone or in combination with one or more of the first through sixteenth aspects, process 500 includes receiving one or more other transmit power control commands from one or more other UEs, and generating the transmit power control command includes generating the transmit power control command based at least in part on the one or more other transmit power control commands.

In an eighteenth aspect, alone or in combination with one or more of the first through seventeenth aspects, the transmit power control command is based at least in part on a maximum transmit power control command of the one or more other transmit power control commands.

In a nineteenth aspect, alone or in combination with one or more of the first through eighteenth aspects, the transmit power control command is based at least in part on a step size associated with one or more links with the one or more other UEs.

In a twentieth aspect, alone or in combination with one or more of the first through nineteenth aspects, the transmit power control command is based at least in part on a particular transmit power control command, of the one or more other transmit power control commands, associated with a particular UE, of the one or more other UEs, with a signal with a lowest signal to noise ratio.

In a twenty-first aspect, alone or in combination with one or more of the first through twentieth aspects, process 500 includes receiving a sidelink control information message triggering generation of the transmit power control command.

In a twenty-second aspect, alone or in combination with one or more of the first through twenty-first aspects, the sidelink control information message is received in connection with a sidelink channel payload.

In a twenty-third aspect, alone or in combination with one or more of the first through twenty-second aspects, a gap between the sidelink control information message and the signal to interference noise ratio measurement is greater than a time threshold.

In a twenty-fourth aspect, alone or in combination with one or more of the first through twenty-third aspects, the transmit power control command is based at least in part on a plurality of transmit power control commands generated during a time period between receiving the first sidelink communication and transmitting the transmit power control command.

In a twenty-fifth aspect, alone or in combination with one or more of the first through twenty-fourth aspects, the transmit power control command is transmitted using a first available transmission resource.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
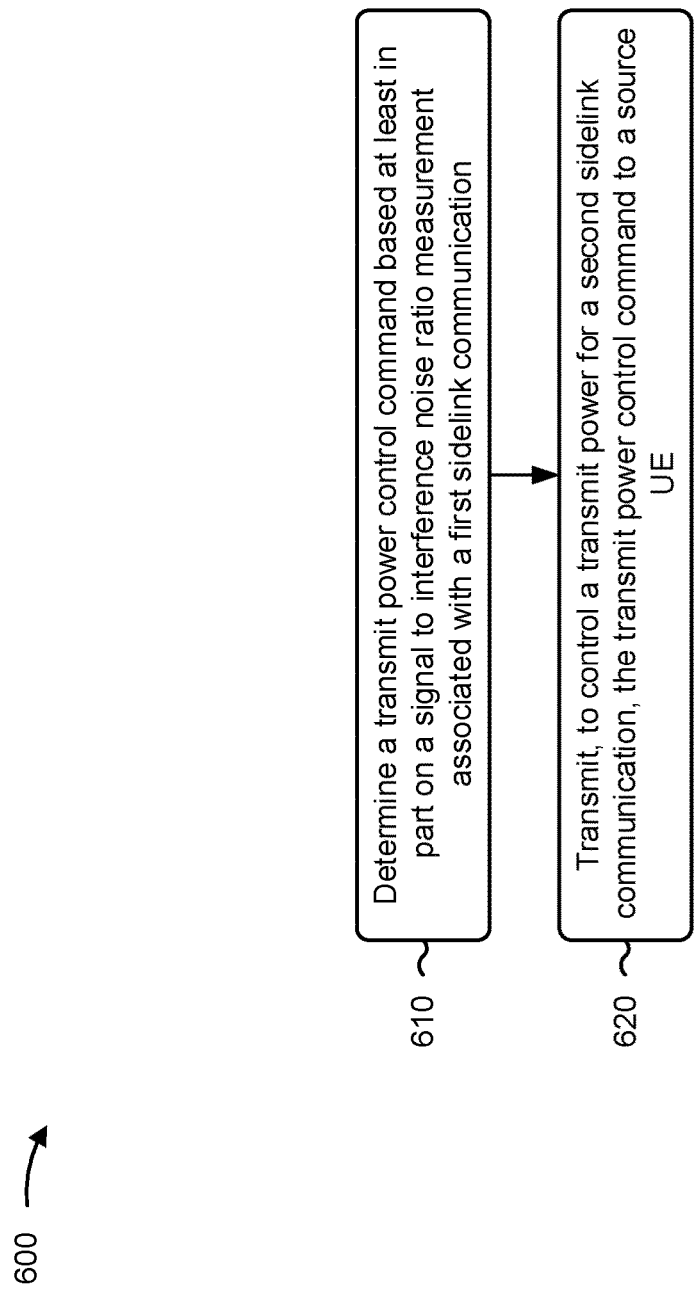
FIG. 6 is a diagram illustrating an example process performed, for example, by a network entity, in accordance with various aspects of the present disclosure.

FIG. 6 is a diagram illustrating an example process 600 performed, for example, by a UE, in accordance with various aspects of the present disclosure. Example process 600 is an example where a network entity (e.g., BS 110, UE 120, network entity 405, and/or the like) performs operations associated with sidelink transmit power control command generation.

As shown in FIG. 6, in some aspects, process 600 may include determining a transmit power control command based at least in part on a signal to interference noise ratio measurement associated with a first sidelink communication (block 610). For example, the network entity (e.g., using controller/processor 240, controller/processor 280, and/or the like) may determine a transmit power control command based at least in part on a signal to interference noise ratio measurement associated with a first sidelink communication, as described above.

As further shown in FIG. 6, in some aspects, process 600 may include transmitting, to control a transmit power for a second sidelink communication, the transmit power control command to a source user equipment (UE) (block 620). For example, the network entity (e.g., using controller/processor 240, transmit processor 220, TX MIMO processor 230, MOD 232, antenna 234, controller/processor 280, transmit processor 264, TX MIMO processor 266, MOD 254, antenna 252, and/or the like) may transmit, to control a transmit power for a second sidelink communication, the transmit power control command to a source UE, as described above.

Process 600 may include additional aspects, such as any single aspect or any combination of aspects described below and/or in connection with one or more other processes described elsewhere herein.

In a first aspect, determining the transmit power control command includes generating the transmit power control command.

In a second aspect, alone or in combination with the first aspect, determining the transmit power control command includes consolidating one or more received transmit power control commands.

In a third aspect, alone or in combination with one or more of the first and second aspects, at least one of the one or more received transmit power control commands is a consolidated transmit power control command.

In a fourth aspect, alone or in combination with one or more of the first through third aspects, process 600 includes receiving one or more other transmit power control commands from one or more other UEs, and generating the transmit power control command includes generating the transmit power control command based at least in part on the one or more other transmit power control commands.

In a fifth aspect, alone or in combination with one or more of the first through fourth aspects, the transmit power control command is based at least in part on a maximum transmit power control command of the one or more other transmit power control commands.

In a sixth aspect, alone or in combination with one or more of the first through fifth aspects, the transmit power control command is based at least in part on a step size associated with one or more links with the one or more other UEs.

In a seventh aspect, alone or in combination with one or more of the first through sixth aspects, the transmit power control command is based at least in part on a particular transmit power control command, of the one or more other transmit power control commands, associated with a particular UE, of the one or more other UEs, with a signal with a lowest signal to noise ratio.

In an eighth aspect, alone or in combination with one or more of the first through seventh aspects, a gap between receiving the transmit power control command for relay and transmitting the transmit power control command is greater than a time threshold.

In a ninth aspect, alone or in combination with one or more of the first through eighth aspects, the time threshold is based at least in part on a capability of the network entity.

In a tenth aspect, alone or in combination with one or more of the first through ninth aspects, the network entity is a UE or a base station.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving, by the UE and from a source UE, a first sidelink communication;
   generating, by the UE, a transmit power control command, to control a transmit power of the source UE and for a second sidelink communication, based at least in part on:
      a signal to interference noise ratio measurement, of the UE, associated with the first sidelink communication, and
      one or more other transmit power control commands received by the UE from one or more other UEs; and
   transmitting, by the UE, the transmit power control command to the source UE.

2. The method of claim 1, wherein the signal to interference noise ratio measurement is performed on a reference signal transmitted in connection with the first sidelink communication, and wherein the reference signal is at least one of: a channel state information reference signal, a sounding reference signal, or a demodulation reference signal.

3. The method of claim 1, wherein the signal to interference noise ratio measurement is performed on decoded data symbols of the first sidelink communication.

4. The method of claim 1, wherein the transmit power control command is based at least in part on a power offset value.

5. The method of claim 4, wherein the power offset value is based at least in part on a transmit data-to-pilot power ratio or a modulation and coding scheme.

6. The method of claim 1, wherein the signal to interference noise ratio measurement is performed on another transmission that is quasi co-located with the first sidelink communication.

7. The method of claim 1, wherein the transmit power control command is based at least in part on a type of channel of the first sidelink communication.

8. The method of claim 7, wherein the type of channel is at least one of:
   a physical sidelink control channel,
   a physical sidelink shared channel,
   a physical sidelink feedback channel,
   a sidelink channel state information reference signal channel,
   a sidelink tracking reference signal channel, or
   a sidelink positioning reference signal channel.

9. The method of claim 1, wherein the transmit power control command is based at least in part on a type of transmission of the first sidelink communication.

10. The method of claim 9, wherein the type of transmission is a groupcast transmission or a unicast transmission.

11. The method of claim 9, wherein a periodicity of the signal to interference noise ratio measurement is based at least in part on a processing characteristic of the first sidelink communication.

12. The method of claim 1, wherein the transmit power control command is based at least in part on a signal to noise ratio difference between the first sidelink communication and another communication.

13. The method of claim 1, wherein the transmit power control command is based at least in part on a channel state information interference measurement.

14. The method of claim 1, wherein the transmit power control command is based at least in part on a vacant resource element measurement.

15. The method of claim 1, wherein the first sidelink communication is received based at least in part on monitoring for the first sidelink communication.

16. The method of claim 1, wherein the transmit power control command is generated based at least in part on the signal to interference noise ratio measurement satisfying a threshold.

17. The method of claim 16, wherein the threshold is based at least in part on at least one of:
   an interference criterion,
   a reference signal received power,
   a modulation and coding scheme on another link that is interfered with by the first sidelink communication, or
   a configuration of a receiver beam.

18. The method of claim 1, wherein the transmit power control command is based at least in part on a maximum transmit power control command of the one or more other transmit power control commands.

19. The method of claim 1, wherein the transmit power control command is based at least in part on a step size associated with one or more links with the one or more other UEs.

20. A method of wireless communication performed by a network entity, comprising:
determining, by the network entity, a transmit power control command, to control a transmit power of a source user equipment (UE) and for a first sidelink communication, based at least in part on:
a signal to interference noise ratio measurement, of the source UE or the network entity, associated with a second sidelink communication, and
one or more other transmit power control commands received by the network entity from one or more other UEs; and
transmitting, by the network entity, the transmit power control command to the source UE.

21. The method of claim 20, wherein determining the transmit power control command comprises:
generating the transmit power control command.

22. The method of claim 20, wherein determining the transmit power control command comprises:
consolidating one or more other transmit power control commands.

23. The method of claim 22, wherein at least one of the one or more other transmit power control commands is a consolidated transmit power control command.

24. The method of claim 20, wherein the transmit power control command is based at least in part on a maximum transmit power control command of the one or more other transmit power control commands.

25. The method of claim 21, wherein the transmit power control command is based at least in part on a step size associated with one or more links associated with the one or more other UEs.

26. The method of claim 21, wherein the transmit power control command is based at least in part on a particular transmit power control command, of the one or more other transmit power control commands, associated with a particular UE, of the one or more other UEs, with a signal associated with a lowest signal to noise ratio.

27. A user equipment (UE) for wireless communication, comprising:
a memory; and
one or more processors coupled to the memory, the one or more processors configured to:
receive, from a source UE, a first sidelink communication;
generate, by the one or more processors, a transmit power control command, to control a transmit power of the source UE and for a second sidelink communication, based at least in part on:
a signal to interference noise ratio measurement, of the UE, associated with the first sidelink communication, and
one or more other transmit power control commands received by the UE from one or more other UEs; and
transmit, by the one or more processors, the transmit power control command to the source UE.

28. A network entity for wireless communication, comprising:
a memory; and
one or more processors coupled to the memory, the one or more processors configured to:
determine a transmit power control command, to control a transmit power of a source user equipment (UE) and for a first sidelink communication, based at least in part on:
a signal to interference noise ratio measurement, of the source UE or the network entity, associated with a second sidelink communication, and
one or more other transmit power control commands received by the network entity from one or more other UEs; and
transmit the transmit power control command to the source UE.

29. The UE of claim 27, wherein the signal to interference noise ratio measurement is performed on at least one of:
a reference signal transmitted in connection with the first sidelink communication, wherein the reference signal is at least one of: a channel state information reference signal, a sounding reference signal, or a demodulation reference signal, or
decoded data symbols of the first sidelink communication.

30. The UE of claim 27, wherein the transmit power control command is based at least in part on at least one of:
a power offset value,
a type of channel of the first sidelink communication,
a type of transmission of the first sidelink communication,
a signal to noise ratio difference between the first sidelink communication and another communication,
a channel state information interference measurement,
a vacant resource element measurement,
a maximum transmit power control command of the one or more other transmit power control commands, or
a step size associated with one or more links with the one or more other UEs.

* * * * *